US009612831B2

United States Patent
Mendis

(10) Patent No.: US 9,612,831 B2
(45) Date of Patent: Apr. 4, 2017

(54) SYSTEM AND METHOD TO MEASURE AND INCENTIVIZE SOFTWARE REUSE

(75) Inventor: Chandika N. Mendis, Rajagiriya (LK)

(73) Assignee: Virtusa Corporation, Westborough, MA (US)

(*) Notice: Subject to any disclaimer, the term of this patent is extended or adjusted under 35 U.S.C. 154(b) by 734 days.

(21) Appl. No.: 13/301,341

(22) Filed: Nov. 21, 2011

(65) Prior Publication Data
US 2012/0131540 A1    May 24, 2012

Related U.S. Application Data

(60) Provisional application No. 61/416,591, filed on Nov. 23, 2010.

(51) Int. Cl.
G06F 9/44    (2006.01)

(52) U.S. Cl.
CPC ...................... *G06F 8/77* (2013.01)

(58) Field of Classification Search
None
See application file for complete search history.

(56) References Cited

U.S. PATENT DOCUMENTS 6,049,666 A * 4/2000 Bennett et al. ............... 717/130
8,479,145 B2 * 7/2013 Swaminathan et al. ...... 717/101

OTHER PUBLICATIONS

Aggarwal et al. Software Reuse Metrics for Object-Oriented Systems Software Engineering Research, Management and Applications, pp. 48-55, Aug. 2005.
Devanbu et al. "Analytical and empirical evaluation of software reuse metrics" Software Engineering, pp. 189-199, Mar. 1996.
Frakes et al. "Reuse level metrics" Software Reuse: Advances in Software Reusability, Proceedings., pp. 139-148, Nov. 1994.
International Search Report and Written Opinion for PCT/US2011/061887, 11 pages, mailed Feb. 29, 2012.

* cited by examiner

*Primary Examiner* — Qamrun Nahar
(74) *Attorney, Agent, or Firm* — Goodwin Procter LLP

(57) ABSTRACT

Systems, methods, and apparatus for measuring software development productivity that incorporate a measure of code reuse. Embodiments of the present invention utilize call graph analysis in a computerized environment to efficiently analyze a software code base in an automated fashion and thereby generate reuse measures; and then incorporates the reuse measures in the productivity analysis.

20 Claims, 7 Drawing Sheets

```
CALL GRAPH MODULE – pseudo code (L01) Read all code units found in the created path into memory, marked as CREATED and SCANNED (L02) For each code unit <CU> in memory (L03)     Scan <CU> to discover the size and code units that are called from <CU>

(L04)     Store the size of the code unit <CU> as a property of the code unit representation in memory (L05)     For each code unit <CCU> thus called (L06)          If not already in memory (L07)               create <CCU> in memory, marked as LIBRARY and UNSCANNED (L08)          endif (L09)          create link from <CU> to <CCU>

(L10)     end foreach<CCU>

(L11) end foreach<CU>

(L12) loop {

(L13)     for each code unit <LCU> in the library path that is also in memory and marked as UNSCANNED (L14)          scan <LCU> to find out size and all the code units that are called from <LCU>

(L15)          Store the size of the code unit <LCU> as a property of the code unit representation in memory (L16)          For each code unit <LCCU> called from <LCU> (discovered from the scanning process)

(L18)               if <LCCU> not already in memory (L19)                    create the called code unit in memory, marked as LIBRARY, UNSCANNED (L19)               endif (L20)               create call-link in memory from <LCU> into <LCCU>

(L21)          end foreach (L22) } until nothing changed in the last run of the loop
```

FIG. 6

SYSTEM AND METHOD TO MEASURE AND INCENTIVIZE SOFTWARE REUSE

CROSS-REFERENCE TO RELATED APPLICATIONS

This application claims priority to and the benefit of U.S. Provisional Patent Application Ser. No. 61/416,591, filed Nov. 23, 2010, which is incorporated herein by reference in its entirety.

TECHNICAL FIELD

Embodiments of the invention generally relate to measuring software quality and development productivity, and utilizing software reuse as an element of such measurements. Specific embodiments utilize a software reuse metric based on call graph analysis and a lines of code metric to determine an effective lines of code metric for measuring software quality and development productivity.

BACKGROUND

Effective measures of software quality and development productivity (hereinafter "software productivity" unless otherwise indicated) can be important tools for predicting costs and evaluating the quality or benefit of completed projects. Existing methodologies typically are variations on one or both of two techniques: (1) lines of code (hereinafter "LOC") measures; and (2) function point analysis.

LOC measures simply count the number of lines of text of a program's source code. Cost and benefit are determined by simply calculating the dollar cost per line of code. LOC measures are simple to understand, easy to compare, and easy to collect. However, while effort may be highly correlated with LOC measures, the amount of functionality of the software is not necessarily heavily correlated to LOC. Moreover, effort is less correlated with LOC measures since the advent of so called "high-level" programming languages that may require extensive pre-programming activities such as drafting requirements and design diagrams. In that case, LOC could drastically underestimate the effort required to code software. Thus, LOC measures may provide an adequate measure of an individual programmer's raw output, but fail to capture the functional quality of that output.

Function point analysis measures the amount of functionality the software provides a user. For example, function point analysis awards more points to a program that provides a user the capability to perform ten essential business tasks than to a program that provides a user the capability to perform only four similarly essential business tasks. Different tasks may be scored differently based on metrics such as type and complexity. Function point analysis by itself does not necessarily provide a measure of how much effort went into developing the software. Further, function point analysis may include some significant element of subjectivity.

Software reuse is widely accepted as a beneficial technique for managing the cost of developing software. In particular, the reuse of quality software to save resources is a widely accepted goal. The simple LOC measures described above may actually disincent reuse. Reuse incurs the cost of learning the use of the component, which may be offset by the functionality provided by the reusable component. However, using LOC measures of "work size" or output simply accounts for the cost of learning without factoring in the benefit of reuse into the lines of code measure, which could result in an inaccurate lower productivity metric for an otherwise effective example of reuse. Thus, reuse metrics may be used to improve both LOC measures and the function point analysis. Measuring reuse may be cumbersome or even impossible. The traditional way of calculating reuse involves manual effort, where the number of lines of code of both the created code and the reused code are counted (using either manual counts or through a line counting tool) and then are used to calculate the reuse percentage. This is difficult if the source code of the reused libraries are unavailable, which is typically the case for reused software. Even when source code is available, it is difficult to manually identify the re-used parts of code from the library, so manual measures of reuse will typically over-estimate the reuse measurement when the entire library is counted.

Thus, there is a need for a convenient and automated technique for measuring code reuse. With such a technique, there is still a need for useful reuse metrics that utilize such a technique.

SUMMARY

In general, various aspects of the systems, methods, and apparatus described herein address the deficiencies of the prior art noted above. Those of ordinary skill in the art will recognize that other benefits exist beyond overcoming the above noted deficiencies of the prior art. In particular, the present invention addresses the shortcomings of prior art LOC and function point analysis by incorporating a measure of reuse. Embodiments of the present invention utilize call graph analysis in a computerized environment to efficiently analyze a software code base in an automated fashion and thereby generate such reuse measures.

In one aspect, embodiments of the present invention provide a method for determining an effective productivity measure of a code base. A computer executes a program encoded on a computer-readable medium that determines a lines of code measure and a call graph of a code base. Based on the call graph, the computer determines a measure of reuse of the code base. Then, based on the reuse measure and lines of code measure, the computer determines an effective lines of code measure.

In another aspect, embodiments of the present invention provide a method for determining a productivity measure of a code base. A computer executes a program encoded on a computer-readable medium that determines (i) a lines of code measure for each programming language represented in the code base (LOC), (ii) a duplicated code ratio for each programming language represented in the code base ($R_{dup}$); (iii) a reuse ratio for each programming language ($R_{reuse}$); and (iv) a function point gearing factor for each programming language represented in the code base ($GF_{lang}$). Based on these computed values, the computer determines an adjusted backfired function point measure for the code base according to the formula:

$$\Sigma\{(LOC \times (1-R_{dup})/(1-R_{reuse})) \times GF_{lang}\}$$

In yet another aspect, embodiments of the present invention provide a computer program product for enabling a computer to determine a productivity measure of a code base. A non-transitory computer readable medium has encoded thereon software instructions that when executed enable the computer to perform the operations of determining a lines of code measure and a call graph, both based on a code base. The computer, executing the software instructions, subsequently determines a measure of reuse of the code base based on the call graph. Then, based on the measure of reuse and the lines of code measure, the software instructions instruct the computer to determine an effective lines of code measure.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 6 is pseudo code depicting an exemplary operation of the Call Graph Module of FIG. 5.

Figure 1:
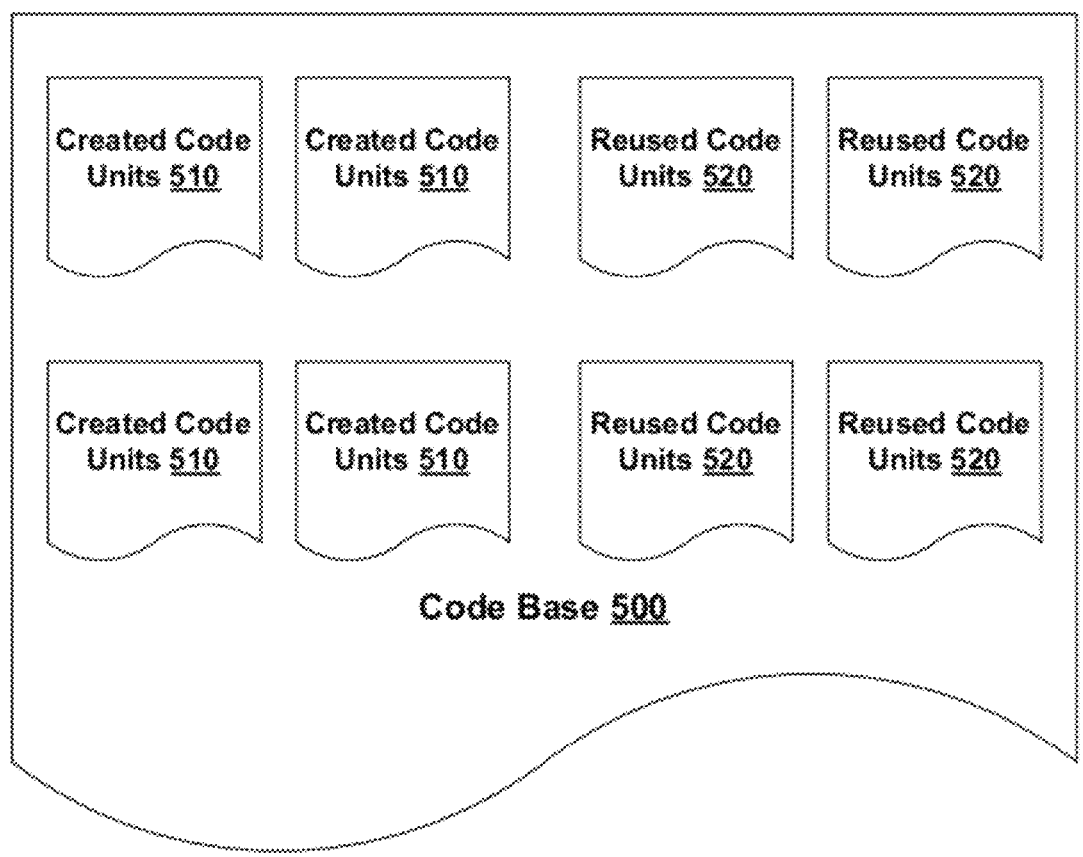
FIG. 1 illustrates a exemplary code base suitable for use with embodiments of the invention.

Items in the drawings are not necessarily to scale, emphasis instead being placed upon illustrating the principles and concepts of the invention.

DETAILED DESCRIPTION

The following description presents exemplary embodiments of methods and systems consistent with the present invention, which should not be interpreted to limit the scope of the claimed invention.

FIG. 1 illustrates a Code Base 500 suited to analysis by embodiments of the invention. The Code Base 500 is embodied in human-readable software instructions or the compiled version thereof being executable by a computer having a processor and memory. The Code Base 500 includes both Created Code Units 510 and Reused Code Units 520. Created Code Units 510 are created anew for a particular software product, and Reused Code Units 520 generally consist of preexisting materials. Reused Code Units 520 may be lines of code included in the Code Base 500 or may be libraries linked in to the Code Base 500. The Reused Code Units 520 may be "called" (e.g., methods or functions within the library are called such that they are executed at runtime) by one or more of the Created Code Units 510.

Figure 2:
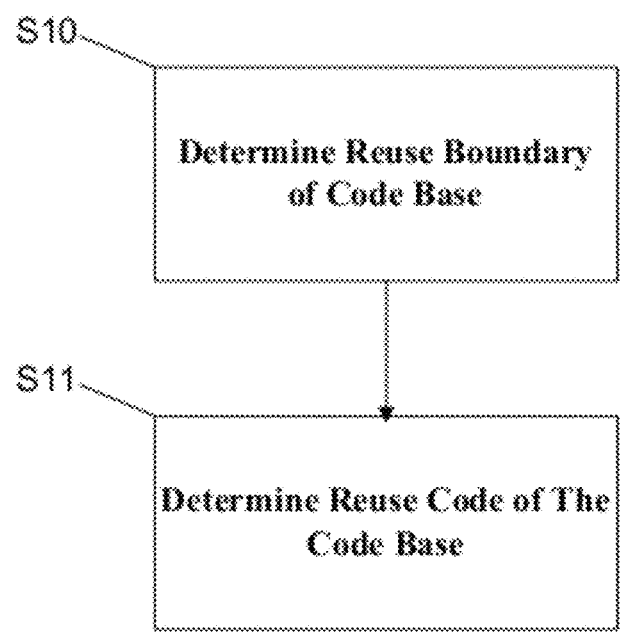
FIG. 2 sets forth an exemplary process for determining a reuse measure for a code base in accord with the present invention.

FIG. 2 illustrates an algorithm for determining a measurement of the Reuse Code 520 in the Code Base 500 according to an exemplary embodiment of the invention. The algorithm includes: determining the Reuse Boundary of a Code Base 500 (Step S10), and determining the Reuse Code 520 of the Code Base 500 based on the Reuse Boundary (Step S11).

Figure 3:
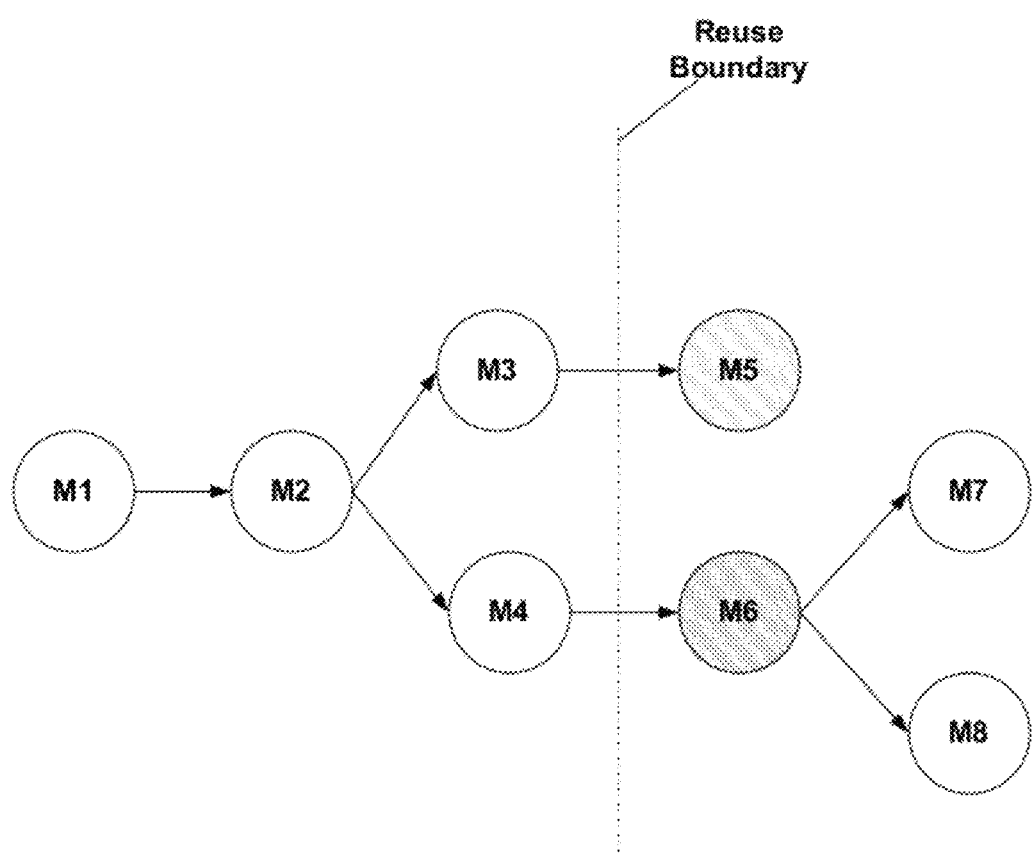
FIG. 3 illustrates by way of a directed graph the reuse boundary of an exemplary code base.

FIG. 3 illustrates the concept of a reuse boundary in an exemplary code base. The reuse boundary is a conceptual barrier between created code and reused code and illustrates code units marked as "created" or "reused" as part of the algorithm consistent with the present invention. Demarcation of created code from the reused code is an important pre-requisite to calculate the reuse ratio. This boundary may be identified by passing the paths to the created code and reused code in separate parameters to a reuse calculation module. The invention is not restricted to this mechanism and will work with other mechanisms for distinguishing between created and reused code (e.g., providing the root package or name of the created code, etc.).

Figure 4:
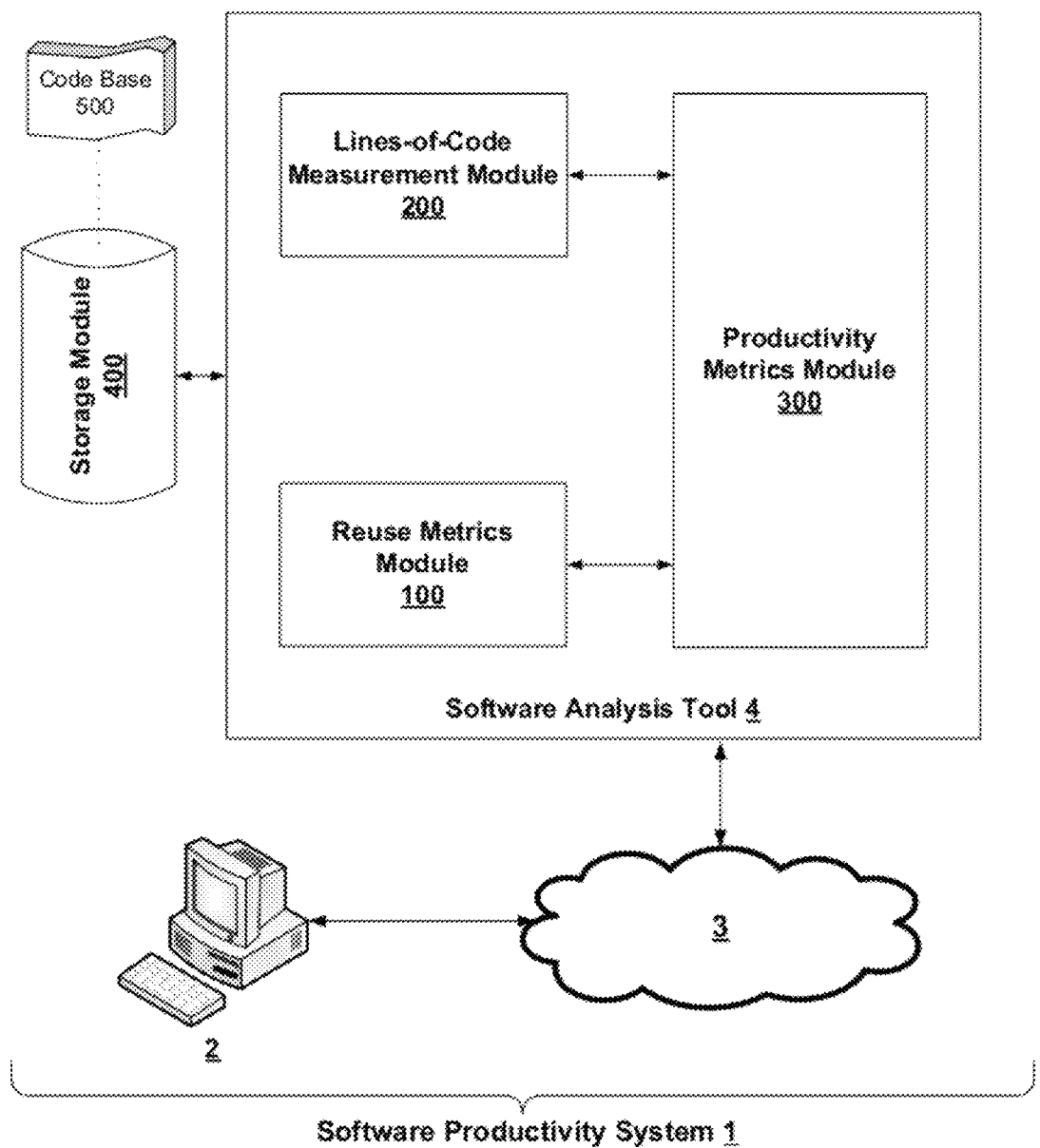
FIG. 4 illustrates a Software Productivity System according to an exemplary embodiment of the invention.

FIG. 4 illustrates an exemplary embodiment of a Software Productivity System 1 that provides productivity metrics for a code base in accord with the principles of the present invention. The Software Productivity System 1 includes a User Device 2, a Network 3, a Software Analysis Tool 4 and a Storage Module 400. Although FIG. 4 depicts only one User Device 2, one Network 3, one Software Analysis Tool 4, one Storage Module 400, etc., other embodiments of the Software Productivity System 1 may include a plurality of one or more of these components. For example, in an enterprise environment, each business unit may deploy a Software Analysis Tool 4 and a Storage Module 400. Reports generated by the Software Analysis Tool 4 may be reported to a central server (not shown) for review and further analysis.

The Storage Module 400 stores a code base, such as Code Base 500 (see FIG. 1) that is available to the Software Analysis Tool 4. In one embodiment the Storage Module 400 is a source control repository. The Storage Module 400 may store any representation of a Code Base 500, including, but not limited to, source code, binary code, pseudo-code, etc.

In one embodiment the Storage Module 400 may be a computer storage medium local to the Software Analysis Tool 4; and the Storage Module 400 and Software Analysis Tool 4 communicate over a system bus. In another embodiment the Storage Module 400 may be remote from the Software Analysis Tool 4, and the two modules communicate over a network. In a network, the Storage Module 400 may include (or be part of) a distributed storage system, such as network-attached-storage (NAS) or a storage-area-network (SAN).

Information may be stored in the Storage Module 400 in one or more databases. The particular architecture of the database may vary according to the specific type of data stored, the mode of access of the data, or the intended use of the data stored in the database. A database management system (DBMS) may control and manage the storage of the data in the database using any number of query languages to access the database, including, without limitation structured query language (SQL).

The Software Analysis Tool 4 may be part of or include a computer system. In the embodiment illustrated in FIG. 4, the Software Analysis Tool 4 includes a Reuse Metrics Module 100, a Lines-of-Code Measurement Module 200, and a Productivity Metrics Module 300. Each of the Reuse Metrics Module 100, Lines-of-Code Measurement Module 200, and Productivity Metrics Module 300 may also be part of or include a computer system.

In each case, the computer system may include a general purpose computing device in the form of a computer including a processing unit, a system memory, and a system bus that couples various system components including the system memory to the processing unit. The computer system may include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by the processing unit. The data or program modules may include an operating system, application programs, other program modules, and program data. The operating system may be one of or include a variety of operating systems such as the Microsoft Windows® operating system, the Unix® operating system, the Linux operating system, or another operating system or platform.

The functionality provided by the modules may be combined into fewer components and modules or further separated into additional components and modules. Additionally, the components and modules may advantageously be implemented on many different platforms, including computers, servers, data communications infrastructure equipment such as application-enabled switches or routers, or telecommunications infrastructure equipment, such as public or private telephone switches or private branch exchanges (PBX).

The Software Analysis Tool 4 and its various modules may include routines, programs, objects, components, data structures, etc. that perform particular tasks or implement particular abstract data types in furtherance of the functionality described herein. The computer-executable instructions constituting these items are stored temporarily or permanently in memory for execution by a processor. The program modules may be developed using any suitable programming language, which is compiled to machine language or object code to allow the processor or processors to execute the corresponding instructions.

Embodiments of the present invention may also be provided as computer-readable instructions embodied on or in one or more articles of manufacture, including the Software Analysis Tool 4 and the Storage Module 400. The article of manufacture may be any suitable computer-readable medium, such as, for example, a floppy disk, a hard disk, a CD, a DVD, a flash memory, or a solid-state memory. In general, the programs are implemented in a programming language, compiled into machine language or virtual machine instructions, and stored in files on or in one or more articles of manufacture.

In one embodiment, the various modules that make up the Software Analysis Tool 4 are part of the same computer system, and communicate over a system bus. In a networked embodiment of the Software Analysis Tool 4, such as an internet-based system, the various modules may be, or be hosted on, one or more computer servers.

In one embodiment, a user may enter commands and information for the Software Analysis Tool 4, as well as view information and reports provided by the Software Analysis tool 4, by way of the User Device 2. The User Device 2 may be a personal computer, and a user may enter commands and information through a user interface that includes input devices such as a keyboard or a touch-screen, and pointing device, commonly referred to as a mouse, trackball or touch pad. In one embodiment, a user may interact with the Software Analysis Tool 4 using these and other input devices in conjunction with a graphical user interface (GUI) provided on the User Device 2; or hosted on a server (possibly a server also hosting the Software Analysis Tool 4), and accessed by a terminal or internet browser local to the User Device 2.

In various embodiments the Network 3 may be implemented as a wired or wireless network. When used in a local area network (LAN), computers may be connected to the LAN through a network interface or adapter. When used in a wide-area network, computers may be connected to the WAN using a modem or other communication mechanism. Embodiments of the present invention may communicate utilizing any number of transport protocols, including, without limitation User Datagram Protocol (UDP) and Transmission Control Protocol (TCP). Furthermore, components of the system may communicate through a combination of wired or wireless paths.

Figure 5:
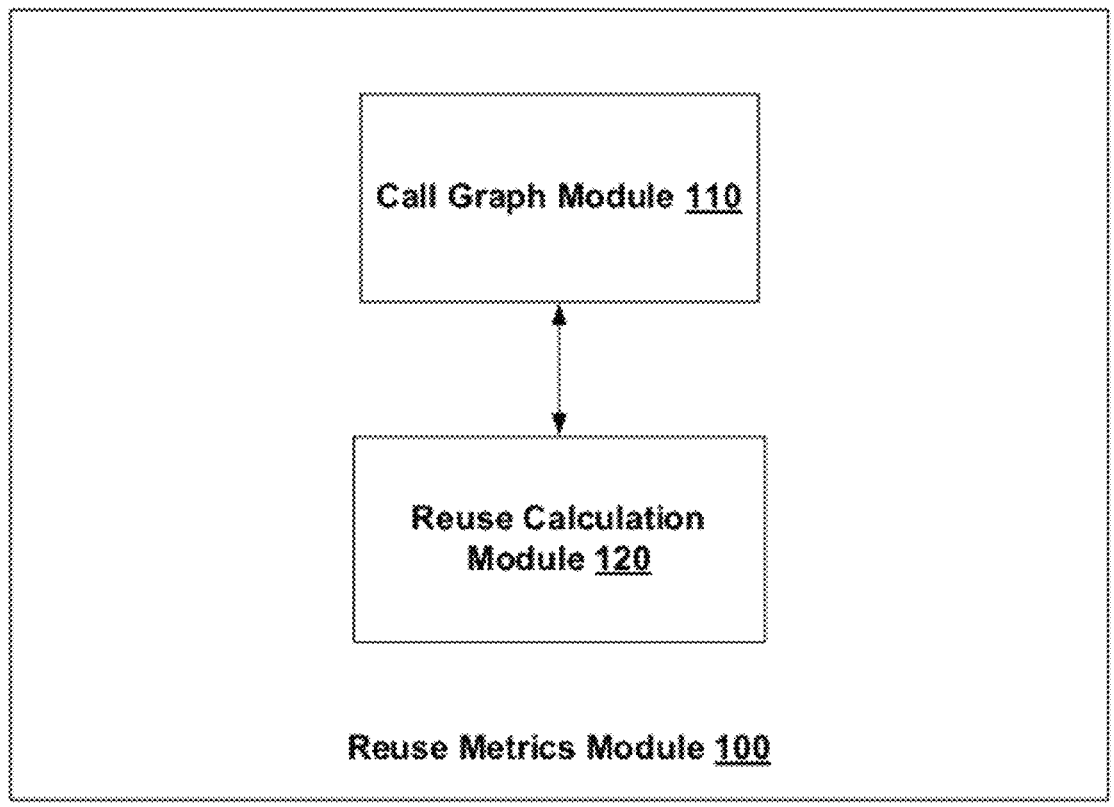
FIG. 5 presents the Reuse Metrics Module of FIG. 4 in more detail.

As illustrated in FIG. 4, in one embodiment the Software Analysis Tool 4 includes a Reuse Metric Module 100. FIG. 5 presents a Reuse Metrics Module 100 according to an exemplary embodiment of the invention. In this embodiment, the Reuse Metrics Module 100 includes a Call Graph Module 110, and a Reuse Calculation Module 120. The Call Graph Module 110 parses the code base provided (such as the Code Base 500 illustrated in FIG. 1) and creates an in-memory representation of the structure of the code units and the calls between them that comprises the code base (also called a call graph representation). The Call Graph Module 110 may also mark each code unit in memory as "CREATED" or "LIBRARY". The Reuse Calculation Module 120 uses this in-memory representation to calculate the sizes of the created code units marked as 'CREATED' and the re-used code units marked as 'LIBRARY,' separately, to calculate and output the reuse measure, which, for example, may be used by the Productivity Metrics Module 300 or transmitted to the User Device 2 for interpretation by a user.

In one exemplary embodiment, the Call Graph Module 110 determines the Reuse Boundary, the amount of created code, and the amount of reused code according to a process that involves a form of call graph analysis as illustrated in FIG. 6. A call graph represents the dependencies of code units within a code base. Those of ordinary skill in the art would recognize that a call graph may take different forms. For example, a call graph may be a directed graph, and the call graph may be dynamic or static. A dynamic call graph can represent the executed dependencies, i.e., those calls actually performed during execution of a program. A static call graph can represent, to an acceptable degree of precision, every dependent relationship between code units across every possible execution of a program.

FIG. 6 sets forth an exemplary operation of the Call Graph 110. To initiate the process, the Call Graph Module 110 receives a path to a Code Base 500 of created code, library code, or both. First, the Call Graph Module 110 scans the created code units of Code Base 500 using the created code path and creates a graph data structure with a "code unit" as the graph node (Step S20) Each code unit object (or node) in the graph data structure includes the code unit's size, links to other code units, whether the code unit is of type 'CREATED' or 'LIBRARY,' and whether it is 'SCANNED' or 'UNSCANNED.' In one exemplary embodiment the code unit structure is a dependency graph in the form of a call graph.

Code units are first loaded into memory from the created code path which is provided as input to the Reuse Metrics Module 100 (Step L01). The process of "scanning" (Steps L03 and L14) involves reading the lines of code inside a code unit to determine the size of the code unit as well as the other code units that are called from this code unit. The Call Graph Module 110 analyzes the loaded code unit to identify calls (e.g., function calls) to other code units (Step L03), and adds any identified called code units to a dependency model stored in memory (Step L07). It also creates the call links between code units (Step L09).

Those of ordinary skill in the art will recognize that a code unit may not actually call any other code units. If the current code unit does not call other code units, the method advances to Step L11.

Once all the created code units are scanned and loaded into memory, the Call Graph Module 110 loops through the code units in the library path, looking for code units in memory that are marked as LIBRARY and UNSCANNED (Step L14). When it finds these code units, the code units are scanned and the dependency graph model updated accordingly (Steps L15-L21).

Loop L12 to L21 is repeated, with each pass searching for UNSCANNED code units in the library path and attempting to update the dependency graph model. The process is halted when a pass through the system fails to make any updates to the internal dependency graph model.

Using the process illustrated in FIG. 6, the amount of Reused Code and Created Code may be identified, and various metrics calculated. With reference to FIG. 3, using the processes illustrated in FIG. 6, the Created Code may be found by summing the size of the code units marked as "CREATED" e.g.:

$$(Size^{M1}+Size^{M2}+Size^{M3}+Size^{M4}+\ldots) \quad \text{Equation 1}$$

Reused Code may be found by summing the size of code units marked as "LIBRARY" e.g.:

$$(Size^{M5}+Size^{M6}+Size^{M7}+Size^{M8}+\ldots) \quad \text{Equation 2}$$

According to one exemplary embodiment, the Reuse % may be calculated using Equation 3 and the computed values for Created and Reused Code:

$$\frac{Reused\_Code}{(Reused\_Code + Created\_Code)} \times 100\% \quad \text{Equation 3}$$

Those of ordinary skill in the art will would recognize that Reuse % may be computed using other methods. Those of ordinary skill in the art would also recognize that a call graph may be created in memory using an algorithm that is different from that shown in FIG. 6. Other optimizations and variations to this algorithm are possible even though not explicitly mentioned. In another embodiment of the reuse calculation, "size" measure above may be replaced with a semantic measurement based on the number and complexity of the API calls that are made. Those of ordinary skill in the art would recognize that other such replacements for the size measure will be possible.

Other useful metrics may be inferred from the constructed call graph. In one exemplary embodiment, the additional metrics may be calculated by mapping the reuse libraries to reused products, and calculating the reuse ratio by product. In this case a product may represent a subset of the reused code determined by an identification mechanism. According to one exemplary embodiment, products may be mapped to their root package or namespace, and that mapping may be used to identify the reused code that belongs to that product. Other useful reuse metrics include the R.O.I. (return-on-investment) of reuse, and reuse cost avoided.

Reuse ratio by product describes how different products contribute to the reuse that is reported for a project. Reuse ratio by product may be used to validate if a product is being fully leveraged in a project, compared to other projects that are also reusing the same product. Reuse ratio by product uses a similar calculation to reuse ratio, except that it counts only the reused code that belongs to that product.

One cost of reuse involves learning the API of the reused component. As the system knows the reuse boundary and can calculate the number of unique calls across this boundary, it can calculate the R.O.I of reuse in terms of the size of the reused functionality obtained for every unique API call a programmer had to learn. The number of unique API calls that cross the reuse boundary may be calculated by counting the total number of reused code units that are called (or linked from) by any created code units. The reused functionality obtained is the sum of all the reused code sizes.

Reuse cost avoided on the project is the number of lines of code that were effectively not written in that project due to reuse. Reuse Cost Avoided is the total reused code size (e.g., in source lines of code) multiplied by the cost per LOC. In one exemplary embodiment, the reuse metrics module operates on binary code. As the cost per LOC is usually given in relation to source LOC, it needs to estimate the reused source LOC from the available measures of "created source LOC" and the "Reuse Ratio". In such a case, reuse cost avoided may be calculated according to Equation 4:

$$\frac{(Created\_Source\_LOC) \times (Reuse\_Ratio)}{(1 - Reuse\_Ratio)} \times Cost\_Per\_LOC \quad \text{Equation 4}$$

Reuse metrics determined by the Reuse Metrics Module 120 may include the R.O.I of reuse of a product and reuse cost avoided for a product. The R.O.I. of Reuse of a product is a measure of all the uses of a product and a total functionality utilized versus the total unique API calls used across the reuse boundary to make use of that functionality. Products with simple and well defined (and therefore typically easier to learn) API interfaces compared to the reused functionality will have a higher R.O.I. of reuse. As already stated, R.O.I. of reuse is a measure of the return on investment realized by reusing code. In one exemplary embodiment, R.O.I. of Reuse may be determined as follows, using the reuse measures described above, and as expressed in Equation 5:

$$\frac{(CreatedSource\_LOC) \times (Product\_Reuse\_Ratoio)}{\left(\begin{array}{c} 1 - Product\_Reuse\_Ratio\_\times \\ (\#\_Calls\_Across\_Reuses\_Boundary) \end{array}\right)} \quad \text{Equation 5}$$

Reuse Cost Avoided for a product may be calculated by summing the result of Equation 4 across an entire project, as expressed in Equation 6:

$$\sum_{1-n}^{PROJECT} \frac{(Created\_Source\_LOC_n) \times (Reuse\_Ratio_n)}{(1 - Reuse\_Ratio_n)} \times Cost\_Per\_LOC_n \quad \text{Equation 6}$$

In Equation 6, the Reuse ratio refers to the product reuse ratio in that project.

Figure 7:
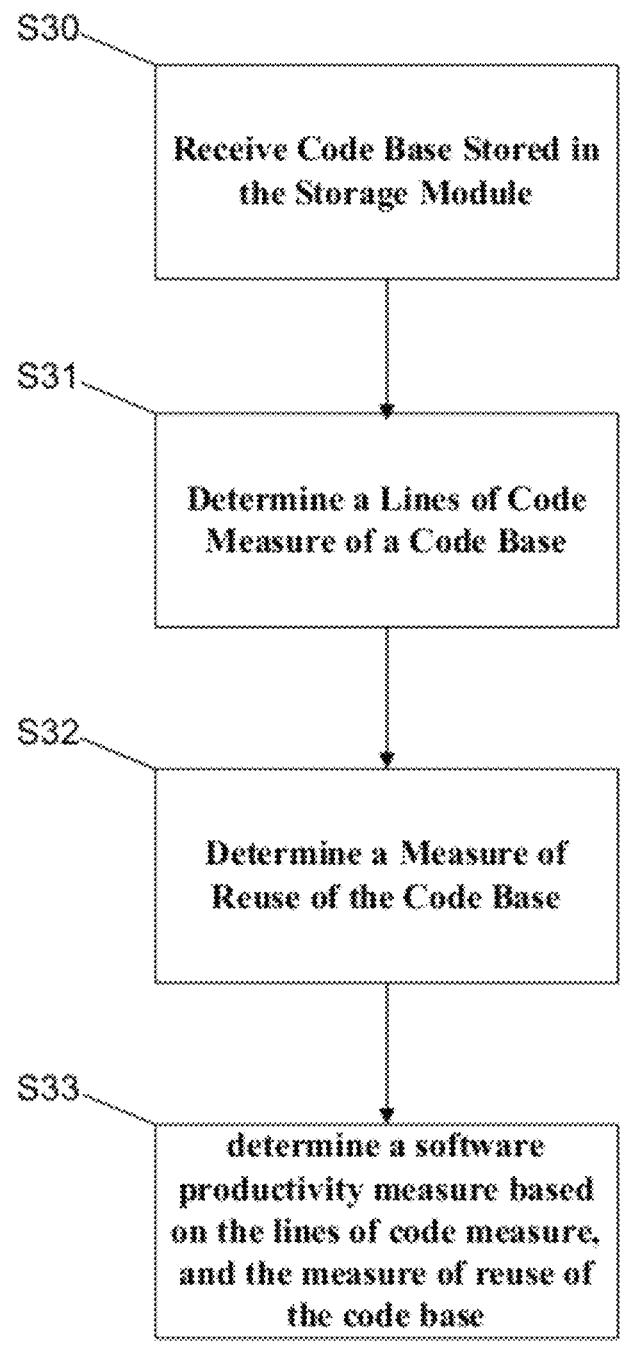
FIG. 7 is a flowchart depicting an exemplary operation of the Software Productivity System of FIG. 4.

FIG. 7 illustrates an exemplary operation of the Software Productivity System 1 presented in FIG. 4. The Software Analysis Tool 4 receives the Code Base 500 from the Storage Module 400 (Step S10). Next, the Lines-Of-Code Measurement Module 200 determines a lines-of-code measure of the Code Base 500 (Step S11), and the Reuse Metrics Module 100 determine a measure of the reuse represented in the Code Base 500 (Step S12). Finally, the Productivity Metrics Module 300 determines a software productivity measure based on the lines of code measure and the measure of the reuse represented in the Code Base 500 (Step S13).

In one embodiment, the software productivity measure utilizes an Effective Functionality for Productivity metric. The Functionality for Productivity metric may be calculated according to Equation 6:

$$\frac{(Adjusted\_Backfired\_Function\_Points)}{Effort} \times 160 \qquad \text{Equation 6}$$

In an exemplary embodiment, Effort is the total hours recorded by the developers on the project, either manually or by an effort tracking system. Equation 6 calculates the amount of reuse adjusted function points created for a programmer's month of effort. Those of ordinary skill in the art will would recognize that other variations of this formula and productivity representation are equally valid, for example hours per Function Points.

Backfired Function Points is a function point analysis technique that operates on the assumption that a certain number of lines of code may equate to a certain number of function points produced by the code base. Adjusted Backfired Function Points adjusts this figure to the impact from duplication and reuse. In one exemplary embodiment, Adjusted Backfired Function Points is calculated according to Equation 7:

$$\sum_{lang} (LOC \times (1 - R_{dup}) \div (1 - R_{reuse}) - (n_1 \times wd)) \times GF_{lang} \qquad \text{Equation 7}$$

LOC is a lines-of-code measure associated with a particular programming language utilized in the Code Base 500. LOC may be based on industry standard best practices associated with the programming language, or internal observations based on average or median lines-of-code measures for a given programming language. LOC may also take into account the type of program embodied in the Code Base 500.

$R_{dup}$ is a duplicated code ratio for the programming language associated with the Code Base 500. In one exemplary embodiment, $R_{dup}$ is calculated by identifying similar code blocks in the code base, and calculates the ratio of code that is duplicated against the entire codebase.

$R_{reuse}$ is the reuse ratio for the programming language associated with the Code Base 500.

"wd" is a measure of the number of code quality defects in the created code against the total size (in backfired function points) of the codebase weighted by severity.

"n1" is a factor by which the effective lines-of-code is adjusted down for quality issues. This may be calculated using historical and experiential data points as relevant for the organization.

$GF_{lang}$ is a function points gearing factor used to convert a lines of code measure to a function point measure. This may be an industry standard factor for which there are multiple industry sources—Capers Jones, QSM etc. Any of these sources or even experiential or organizational data points can be used to calculate the Gearing Factor.

Adjusted Backfired Function Points provide a better measure of the effective work produced compared to Backfired Function Points as it factors in the impacts of reuse, duplication and code quality. Other combinations of these factors may be used to calculate the Adjusted Backfired Function Points. By factoring in these parameters, Adjusted Backfired Function Points effectively deals with the popular arguments against productivity measurement in Software Development—that of promoting bad quality and/or duplicated code as well as dis-incenting reuse. Those of ordinary skill in the art will recognize that other such parameters and variations could be incorporated into the formula based on the organizational or industry experience, to provide a "fair" measure of the work done that incentivizes the right behavior among developers.

In one embodiment, the Software Analysis Tool 4 may be provided in an enterprise environment. In the enterprise environment, code bases may be provided by various enterprise users to the Software Analysis Tool 4, or each enterprise site may utilize its own instantiation of the Software Analysis Tool 4. As size metrics and call-graphs are collected across an enterprise, this aggregated information may be used to support enterprise-wide use cases. When the top level code units (e.g., packages or namespaces) are mapped to actual products, actual product reuse % (or black box reuse %) may be calculated across different departments and applications. These measures create motivation for improving constructive reuse within the enterprise environment. Through this mapping, it is possible to determine which applications and which departments are reusing which products. This information can be used to validate actual reuse on the ground against organizational reuse policies. Validation may occur automatically if the policies are hard coded into the overall Software Productivity System 1. Reuse of a given product can be compared across projects to determine whether the product is being optimally leveraged or only superficially reused.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein are not mutually exclusive and can exist in various combinations and permutations, even if such combinations or permutations were not discussed expressly herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

Although the exemplary embodiments described in FIGS. 2, 6 and 7 and the accompanying text implied the performance of steps in a specific order of operation, no required order should be ascribed to those embodiments. One of ordinary skill in the art will recognize that there are variations to those embodiments, including performing operations in a different order than described.

What is claimed is:

1. A method for determining a productivity measure of a code base, the method comprising: executing by at least one processor capable of executing instructions encoded on a computer-readable medium, the steps of:
   (a) determining a created lines of code measure of a code base;
   (b) determining a call graph based on the code base;
   (c) determining a reuse ratio for the code base based on the call graph; and (d) computing a cost avoided, the computation comprising modifying the created lines of code measure by the reuse ratio for the code base, normalizing the created lines of code measure using a measure of function points of the code base, wherein normalizing the created lines of code measure comprises applying at least one function point gearing factor to the created lines of code measure of the code base, and wherein the at least one function point gearing factor is based on historical data for at least one programming language.

2. The method according to claim 1, wherein determining the created lines of code measure comprises adjusting a lines of code count based on a ratio corresponding to lines of duplicated code.

3. The method according to claim 1, wherein computing a cost avoided comprises adjusting a lines of code count based on the code quality measure.

4. The method of claim 1 further comprising determining the total hours spent developing the code base.

5. The method of claim 3 further comprising determining a productivity measure utilizing the call graph and at least one of the created lines of code measure, the measure of reuse of the code base, the cost avoided, and the total hours spent developing the code base.

6. The method according to claim 1, wherein determining the created lines of code measure comprises counting the total lines of code according to a pre-determined standard.

7. The method according to claim 1, wherein the code base is at least one binary data file.

8. The method according to claim 1, wherein the code base comprises a plurality of programming languages, the method further comprising executing by the processor the steps (a) through (d) for each one of the plurality of programming languages represented in the code base.

9. The method according to claim 8, further comprising determining a backfired function points measure of the code base by summing the plurality of costs avoided.

10. A method for determining a productivity measure of a code base, the method comprising executing the following steps by at least one computer processor:
   determining a lines of code measure for each programming language represented in the code base (LOC);
   determining a duplicated code ratio for each programming language represented in the code base ($R_{dup}$);
   determining a reuse ratio for each programming language ($R_{reuse}$);
   determining a function point gearing factor for each programming language represented in the code base ($GF_{lang}$); and
   determining an adjusted backfired function point measure associated with a number of tasks performed by the code base based on, at least in part, the reuse ratio, according to the formula, $$\sum_{lang} \{(LOC \times (1 - R_{dup})/(1 - R_{reuse})) \times GF_{lang}\}.$$

11. The method according to claim 10, further comprising:
   determining a measure of the number of code quality defects weighted by severity (WD);
   determining a factor by which a lines of code measure is reduced based on the WD measure (n1); and
   determining an adjusted backfired function point measure for the code base according to the formula, $$\sum_{lang} \{(LOC \times (1 - R_{dup})/(1 - R_{reuse}) - (n_1 \times WD)) \times GF_{lang}\}.$$

12. A computer program product for enabling a computer to determine a productivity measure of a code base, comprising:
   a non-transitory computer readable medium; and
   software instructions encoded on the non-transitory computer readable medium that when executed enable the computer to perform the operations of:
   (a) determining a created lines of code measure of a code base;
   (b) determining a call graph based on the code base;
   (c) determining a reuse ratio for the code base based on the call graph; and
   (d) computing a cost avoided, the computation comprising modifying the created lines of code measure by the reuse ratio the code base, normalizing the created lines of code measure using a measure of function points of the code base, wherein normalizing the created lines of code measure comprises applying at least one function point gearing factor to the created lines of code measure of the code base, and wherein the at least one function point gearing factor is based on historical data for at least one programming language.

13. The computer program product according to claim 12, wherein determining the created lines of code measure comprises adjusting a lines of code count based on a ratio corresponding to lines of duplicated code.

14. The computer program product according to claim 12, wherein computing a cost avoided comprises adjusting a lines of code count based on the code quality measure.

15. The computer program product according to claim 12 further comprising determining the total hours spent developing the code base.

16. The computer program product according to claim 15 further comprising determining a productivity measure utilizing the call graph and at least one of the lines of code measure, the measure of reuse of the code base, the cost avoided, and the total hours spent developing the code base.

17. The computer program product according to claim 12, wherein determining the created lines of code measure comprises aggregating counts of modified and added code.

18. The computer program product according to claim 12, wherein the code base is at least one binary data file.

19. The computer program product according to claim 12:
   wherein the code base comprises a plurality of programming languages; and
   the software instructions enable the computer further to perform the operations (a) through (d) for each one of the plurality of programming languages represented in the code base.

20. The computer program product according to claim 18, further comprising determining a backfired function points measure of the code base by summing the plurality of costs avoided.

* * * * *